United States Patent Office 3,247,265
Patented Apr. 19, 1966

3,247,265
1,1-DICHLOROOLEFINS
Angelo John Speziale, Kirkwood, and Gino Joseph Marco, Webster Groves, Mo., assignors to Monsanto Company, a corporation of Delaware
No Drawing. Filed Feb. 12, 1962, Ser. No. 172,751
9 Claims. (Cl. 260—649)

This application is a continuation-in-part of copending application Serial No. 862,480, filed December 29, 1959, now abandoned.

This invention relates to a new and useful method of making 1,1-dichloroolefins.

The principal purpose of this invention is to provide a novel method of synthesis by which a wide variety of 1,1-dichloroolefins can be prepared. Another purpose is to provide a less hazardous method of preparing 1,1-dichloroolefins than those employed heretofore, as for example the dehydrochlorination of compounds having the radical >CH—CCl$_3$. A further purpose is to provide monomers for use in the preparation of a variety of useful chlorine containing resinous substances by olefinic polymerization. Still further purposes are to provide biologically toxic substances and intermediates for the preparation of more active insecticides.

The method of this invention involves the preparation of 1,1-dichloroolefins of the formula

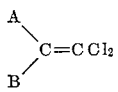

wherein A and B respectively are hydrogen or hydrocarbyl radicals free of acetylenic unsaturation or said hydrocarbyl radicals having substituents such as halogen, lower alkoxy, nitro, amino, mono-(lower alkyl)amino or di-(lower alkyl)amino by reacting in an inert organic liquid medium a compound of the formula

wherein A and B have the aforedescribed significance with a phosphinedichloromethylene of the formula

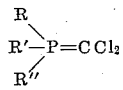

wherein R, R' and R'' respectively contain from 1 to 12 carbon atoms and are alkyl or alkoxyalkyl.

The

reactants of the process of this invention include formaldehyde and a wide variety of aldehydes and ketones, as for example acetaldehyde, propionaldehyde, butyraldehyde, valeraldehyde, heptaldehyde, laureldehyde, stearaldehyde, acrolein, crotonaldehyde, olealdehyde, benzaldehyde, the various tolualdehydes, tert.-butylbenzaldehyde, naphthaldehyde, phenylacetaldehyde, naphthylacetaldehyde, cyclohexylacetaldehyde, phenpropionaldehyde, cinnamaldehyde, biphenylylacetaldehyde, acetone, methyl ethyl ketone, diisopropyl ketone, laurone, palmitone, stearone, methyl heptadecyl ketone, methyl vinyl ketone, phorone, mesityl oxide, allyl ethyl ketone, undecenyl methyl ketone, heptadecenyl methyl ketone, acetophenone, isovalerophenone, lauroyl-benzene, stearoylbenzene, oleyoyl-benzene, cyclohexanone, benzophenone, ditolyl phenone, dibenzyl ketone, di(tert.-butylphenyl) ketone, di(isoamylphenyl) ketone, dicyclohexyl ketone, methyl cyclohexyl ketone, and the like, and said aldehydes and said ketones and the like having substituents such as halogen, lower alkoxy, nitro, amino, mono-(lower alkyl)amino and di(lower alkyl)amino, exemplary of which are mono-, di- and tri-chloroacetaldehydes, mono-, di- and tri-bromoacetaldehydes, iodoacetaldehyde, fluoroacetaldehyde, ethoxybutyraldehyde, the various chlorobenzaldehydes, the various bromobenzaldehydes, the various iodobenzaldehydes, the various fluorobenzaldehydes, the various nitrobenzaldehydes, the various lower alkoxy substituted benzaldehydes such as 4-ethoxybenzaldehyde, the various amino substituted benzaldehydes such as p-amino, p-monoethylamino- and p-diethylamino-benzaldehydes, mono-chloroacetone, alpha-dichloroacetone, alpha-chloroacetophenone, 4-chloroacetophenone, 4-nitroacetophenone, 4-aminoacetophenone, 4-chlorobenzophenone, 4-nitrobenzophenone, and the like. In general A and B will be like or unlike hydrocarbyl radicals of from 1 to 11 carbon atoms and free of acetylenic unsaturation, but preferably aromatic hydrocarbon radicals of from 6 to 10 carbon atoms (e.g. phenyl, tolyl, xylyl, ethylphenyl, cumyl, tert.-butylphenyl, etc.).

The phosphinedichloromethylene reactants of the method of this invention are of the formula

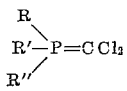

wherein R, R' and R'' are like or unlike, contain from 1 to 12 carbon atoms and are either alkyl or alkoxylalkyl radicals. Exemplary of R, R' and R'' are methyl, ethyl, propyl, butyl, amyl, hexyl, octyl, dodecyl, and the various isomeric alkyl forms thereof containing up to twelve carbon atoms, methoxyethyl, ethoxyethyl, propoxyethyl, amyloxyethyl, decyloxyethyl, ethoxyethoxyethyl, methoxypropyl, and the various isomeric alkoxyalkyl forms thereof containing up to twelve carbon atoms. In general it is preferred that the respective R, R' and R'' groups be alkyl radicals containing 1 to 8 carbon atoms.

The phosphinedichloromethylene reactants of the method of this invention are prepared by reacting trialiphatic phosphines of the formula

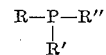

wherein R, R' and R'' have the aforedescribed significance with dichlorocarbene (:CCl$_2$).

Dichlorocarbene is a well known material and methods for its preparation are well described in the literature. For example, it is prepared in an anhydrous system by (1) Reacting an alkali metal lower alkoxide with chloroform,
(2) Heating chloroform in the presence of phenyl lithium,
(3) Heating salts of trichloroacetic acid,
(4) Heating esters of trichloroacetic acid in the presence of alkali metal lower alkoxide.

Dichlorocarbene prepared by any of the known methods for its preparation is unstable but when prepared in the presence of trialiphatic phosphines of the formula

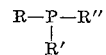

wherein R, R' and R'' have the aforedescribed significance, it reacts spontaneously to form the phosphinedichloromethylene reactants of this invention.

The trialiphatic phosphines useful in preparing the phosphinedichloromethylenes include trimethyl phosphine, triethyl phosphine, the various tripropyl phosphines, tributyl phosphines, triamyl phosphines, trihexyl phosphines, trioctyl phosphines, tridecyl phosphines, tridodecyl phosphines, tri(methoxyethyl) phosphine, tri(ethoxyethyl) phosphine, the various tri(propoxyethyl) phosphines, (dimethyl)(ethyl) phosphine, (diethyl)(methyl) phosphine, (diethyl)(propyl) phosphine, (diethyl)(isoamyl) phosphine, (dimethyl)(methoxyethyl) phosphine, (dimethyl)(ethoxymethyl) phosphine, and the like.

The abovedescribed dichlorocarbene is generated in situ, and reacts immediately with the trialiphatic phosphine to provide the phosphinedichloromethylenes of the method of this invention. In that the phosphinedichloromethylenes are sensitive to water the preparation thereof is preferably conducted in an anhydrous inert organic liquid media. Suitable liquid media include pentane, hexane, heptane, cyclohexane, benzene, toluene, xylene, and like inert liquid hydrocarbons, and also diethyl ether, diisopropyl ether, tetrahydrofuran, etc. While a wide range of reaction temperatures can be employed provided the system is fluid (i.e. a reaction temperature above the freezing point of the system up to and including the boiling point of the system) the optimum temperature will be that required to generate the dichlorocarbene. The preferred reaction temperature is that which produces a substantially quantitative yield of dichlorocarbene from the chlorine containing precursor therefor and which enables a rapid and substantially complete reaction of dichlorocarbene and trialiphatic phosphine.

To illustrate the preparation of the phosphinedichloromethylenes of this invention is the following:

EXAMPLE A

To a suitable reaction vessel equipped with an agitator and thermometer is charged 20.2 grams of tri(n-butyl) phosphine, 12.0 grams of chloroform and 50 ml. of n-heptane. While agitating the mass is cooled to about −35° C. and while maintaining the agitating mass at −30° C. to −40° C. there is added over a 30 minute period 18.6 grams of an anhydrous equimolecular mixture of potassium t-butoxide and t-butanol and 300 ml. of n-heptane. A yellow suspension results, the yellow solid dispersed therein is identified as tri(n-butyl)phosphinedichloromethylene. Since this yellow solid is reactive with moisture it is preferably kept in suspension in the anhydrous inert organic liquid medium (n-heptane in this instance) and under a nitrogen atmosphere until used.

The yellow suspension of Example A is readily concentrated by azeotropically distilling off t-butanol (both added and by-product), the azeotrope in this instance being a mixture of t-butanol and n-heptane.

The preparation of other phosphinedichloromethylene reactants of the method of this invention is described in copending application U.S. Serial No. 155,818, filed November 29, 1961, now U.S. Patent No. 3,095,455.

As illustrative of the method of this invention but not limitative thereof is the following:

*Example I*

To a suitable reaction vessel equipped with a thermometer and agitator is charged an ice-cooled mixture of 20.2 grams of tri(n-butyl) phosphine, 26.2 grams of potassium tert.-butoxide and 250 ml. of heptane. While agitating this ice-cooled (about 0–5° C.) mixture there is added over a 30 minute period 12.0 grams of chloroform in 200 ml. of heptane. Upon completion of this addition the yellow suspension of tri(n-butyl) phosphinedichloromethylene is vacuum distilled at 15–20° C. to remove the tert.-butanol by-product. To this yellow suspension so concentrated and at room temperature is added 18.2 grams of benzophenone in 100 ml. of heptane. This reaction mixture is then heated at 40–50° C. for 30 minutes with agitation. This reaction is then heated up to 70° C. on a steam bath, cooled to room temperature, and then allowed to stand for two days at room temperature. The reaction mass is then filtered to remove tri(n-butyl)phosphine oxide and the filter cake washed with 100 ml. portions of heptane. The washings and original filtrate are combined and evaporated to dryness in vacuo. The yellow oily residue is then crystallized from aqueous ethanol to give solid 1,1-diphenyl-2,2-dichloroethylene (yield 16% by weight; M.P. 79–80° C.).

*Example II*

Employing the procedure of Example I but employing twice as much potassium tert.-butoxide (i.e. 52.4 grams) the yield of 1,1-diphenyl-2,2-dichloroethylene is 28% by weight.

*Example III*

Employing the procedure of Example I but replacing benzophenone with an equimolecular amount of benzaldehyde there is obtained 1-phenyl-2,2-dichloroethylene.

*Example IV*

Employing the procedure of Example I but replacing benzophenone with an equimolecular amount of acetone there is obtained 1,1-dimethyl-2,2-dichloroethylene.

*Example V*

Employing the procedure of Example I but replacing benzophenone with an equimolecular amount of acetophenone there is obtained 1-methyl-1-phenyl-2,2-dichloroethylene.

*Example VI*

Employing the procedure of Example I but replacing benzophenone with an equimolecular amount of 4,4′-dichlorobenzophenone there is obtained 1,1-di(4-chlorophenyl)-2,2-dichloroethylene.

*Example VII*

Employing the procedure of Example I but replacing benzophenone with an equimolecular amount of 4-nitrobenzaldehyde there is obtained 1-(4-nitrophenyl)-2,2-dichloroethylene.

*Example VIII*

Employing the procedure of Example I but replacing benzophenone with an equimolecular amount of lauraldehyde there is obtained 1-(n-undecyl)-2,2-dichloroethylene.

*Example IX*

Employing the procedure of Example I but replacing benzophenone with an equimolecular amount of 4-dimethylaminobenzaldehyde there is obtained 1-(4-dimethylaminophenyl)-2,2-dichloroethylene.

*Example X*

Employing the procedure of Example I but replacing benzophenone with an equimolecular amount of 3,4-dichlorobenzaldehyde there is obtained 1-(3,4-dichlorophenyl)-2,2-dichloroethylene.

*Example XI*

Employing the procedure of Example I but replacing benzophenone with an equimolecular amount of 2,6-dichlorobenzaldehyde there is obtained 1-(2,6-dichlorophenyl)-2,2,-dichloroethylene.

*Example XII*

Employing the procedure of Example I but replacing benzophenone with an equimolecular amount of cinnamaldehyde there is obtained 1-(cinnamenyl)-2,2-dichloroethylene.

*Example XIII*

Employing the procedure of Example I but replacing benzophenone with an equimolecular amount of stearaldehyde there is obtained 1-(n-heptadecyl)-2,2-dichloroethylene.

*Example XIV*

Employing the procedure of Example I but replacing benzophenone with an equimolecular amount of stearoylbenzene there is obtained 1-(n-heptadecyl)-1-phenyl-2,2-dichloroethylene.

Example XV

Employing the procedure of Example I but replacing benzophenone with an equimolecular amount of oleoyl-naphthalene-2 there is obtained 1-(n-heptadec-9-enyl)-1-(2-naphthyl)-2,2-dichloroethylene.

Example XVI

Employing the procedure of Example I but replacing benzophenone with an equimolecular amount of di(4-isoamylphenyl) ketone there is obtained 1,1-di(4-isoamylphenyl)-2,2-dichloroethylene.

Example XVII

Employing the procedure of Example I but replacing benzophenone with an equimolecular amount of laurone there is obtained 1,1-di(n-undecyl)-2,2-dichloroethylene.

Example XVIII

Employing the procedure of Example I but replacing benzophenone with an equimolecular amount of p-chloroacetophenone there is obtained 1-(4-chlorophenyl)-1-methyl-2,2-dichloroethylene.

Example XIX

Employing the procedure of Example I but replacing benzophenone with an equimolecular amount of m-aminoacetophenone there is obtained 1-(3-aminophenyl)-1-methyl-2,2-dichloroethylene.

Example XX

Employing the procedure of Example I but replacing benzophenone with an equimolecular amount of o-nitroacetophenone there is obtained 1-(2-nitrophenyl)-1-methyl-2,2-dichloroethylene.

Example XXI

Employing the procedure of Example I but replacing benzophenone with an equimolecular amount of 4,4'-dinitrobenzophenone there is obtained 1,1-di(4-nitrophenyl)-2,2-dichloroethylene.

Example XXII

Employing the procedure of Example I but replacing benzophenone with an equimolecular amount of 4-nitro-2,5-dimethoxy-benzophenone there is obtained 1-(4-nitro-2,5-dimethoxyphenyl)-1-phenyl-2,2-dichloroethylene.

Example XXIII

Employing the procedure of Example I but replacing benzophenone with an equimolecular amount of monobromoacetone there is obtained 1-(bromomethyl)-1-methyl-2,2-dichloroethylene.

Example XXIV

Employing the procedure of Example I but replacing benzophenone with an equimolecular amount of α,α'-dichloroacetone there is obtained 1,1-di(chloromethyl)-2,2-dichloroethylene.

Example XXV

Employing the procedure of Example I but replacing benzophenone with an equimolecular amount of methyl allyl ketone there is obtained 1-allyl-1-methyl-2,2-dichloroethylene.

Example XXVI

Employing the procedure of Example I but replacing tri-(n-butyl) phosphine with an equimolecular amount of triethylphosphine there is obtained 1,1-diphenyl-2,2-dichloroethylene, the phosphinedichloromethylene reactant here being triethylphosphinedichloromethylene.

Example XXVII

Employing the procedure of Example I but replacing tri-(n-butyl) phosphine with an equimolecular amount of tri-(2-ethylhexyl) phosphine there is obtained 1,1-diphenyl-2,2-dichloroethylene, the phosphine dichloromethylene reactant here being tri-(2-ethylhexyl)phosphinedichloromethylene.

Example XXVIII

Employing the procedure of Example I but replacing tri-(n-butyl) phosphine with an equimolecular amount of tri-(2-ethoxyethyl) phosphine there is obtained 1,1-diphenyl-2,2-dichloroethylene, the phosphine dichloromethylene reactant here being tri(2-ethoxyethyl)phosphinedichloromethylene.

Example XXIX

Employing the procedure of Example I but replacing tri-(n-butyl)phosphine with an equimolecular amount of tri-(n-dodecyl) phosphine there is obtained 1,1-diphenyl-2,2-dichloroethylene, the phosphinedichloromethylene reactant here being tri-(n-dodecyl)phosphine dichloromethylene.

Example XXX

Employing the procedure of Example I but replacing benzophenone with an equimolecular amount of di(4-tolyl)ketone there is obtained 1,1-di(4-tolyl)-2,2-dichloroethylene.

Example XXXI

Employing the procedure of Example I but replacing benzophenone with an equimolecular amount of di(3,5-xylyl)ketone there is obtained 1,1-di(3,5-xylyl)-2,2-dichloroethylene.

Example XXXII

Employing the procedure of Example I but replacing benzophenone with an equimolecular amount of di(4-tert.-butylphenyl) ketone there is obtained 1,1-di(4-tert.-butylphenyl)-1,1-dichloroethylene.

Example XXXIII

Employing the procedure of Example I but replacing benzophenone with an equimolecular amount of methyl vinyl ketone there is obtained 1-methyl-1-(vinyl)-2,2-dichloroethylene.

Example XXXIV

To a suitable reaction vessel equipped with a thermometer and agitator is charged 20.2 grams of tri(n-butyl) phosphine, 26.2 grams of potassium tert.-butoxide and 200 ml. of heptane. While agitating this mixture at room temperature is added 19.1 grams of ethyl trichloroacetate and 100 ml. of heptane. Upon completion of this addition the mass is heated to reflux and then refluxed for 30 minutes and cooled to room temperature. Thereafter and at room temperature is added 18.2 grams of benzophenone in 150 ml. of heptane. The reaction mixture is then heated at 50–55° C. for 30 minutes with agitation, cooled to room temperature and allowed to stand for 24 hours. The mass is then filtered and the filtrate evaporated to dryness. The residue of the filtrate upon recrystallization from aqueous ethanol gives solid 1,1-diphenyl-2,2-dichloroethylene.

Example XXXV

Employing the procedure of Example XXXIV but replacing potassium tert.-butoxide with an equimolecular amount of phenyl lithium and replacing ethyl trichloroacetate with an equimolecular amount of chloroform there is obtained 1,1-diphenyl-2,2-dichloroethylene.

Example XXXVI

To a suitable reaction vessel equipped with a thermometer and agitator is charged a suspension of 29.7 grams of tri(n-butyl)phosphinedichloromethylene in 200 ml. of pentane. While agitating and maintaining the temperature at 0–5° C. there is added over a 30 minute period 18 grams of benzophenone in 50 grams of diethyl ether. A nitrogen atmosphere is maintained in the reaction vessel at all times. Upon completion of the benzophenone addition the mass is agitated for 16 hours, filtered, and the filtrate evaporated to dryness. The residue of the filtrate is then taken up with a 50-50 benzene-hexane mixture, and the mass filtered. The collected filtrate is evaporated to dryness and the residue recrystallized from aqueous ethanol. The solid product is 1,1-diphenyl-2,2-dichloroethylene.

As aforementioned the method of this invention is conducted in an inert organic medium. The phosphinedichloromethylene reactants of the method of the invention regardless of their method of preparation are sensitive to moisture and are therefore prepared and stored in an inert anhydrous organic liquid medium. Accordingly, it is desirable to conduct the method of this invention in the liquid anhydrous organic medium in which the phosphinedichloromethylene reactant was prepared and/or stored. If there is some reason why it is desired to conduct the new reaction in a particular organic liquid, it may be feasible to prepare the phosphinedichloromethylene in that particular liquid, or to transfer the phosphinedichloromethylene to the said particular liquid subsequent to its synthesis for storage or use.

Suitable inert organic liquids for the reaction medium are the cycloaliphatic hydrocarbons such as cyclohexane, cyclopentane, etc., and the aliphatic hydrocarbons, such as hexane, pentane, heptane, petroleum ether, gasoline or other petroleum fractions of narrow boiling point range, and various mixtures thereof. The solvent medium which must be inert serves to prevent contact of the reactants with the atmosphere, particularly with water vapor. Further protection can be had by sweeping the reaction mixture with nitrogen or other inert gas, or by maintaining a nitrogen or other inert gaseous atmosphere within a closed reaction vessel.

Because of the high reactivity of the phosphinedichloromethylene reactant and the resulting reaction product, low temperatures are usually more desirable for both the preparation and the separation of the 1,1-dichloroolefins from the reaction mixture. Reaction temperatures which permit a fluid system (i.e. a temperature above the freezing point of the system) up to about 20° C. are preferred. It is to be understood however that temperatures up to about 75° C. can be employed. Ordinarily the method of this invention will be conducted at atmospheric pressure, however, pressures above or below atmospheric pressure can be used. In general the respective reactants of the method of this invention will be employed in substantially equimolecular proportions, however, a 100% molar excess of the $$A-\underset{\underset{O}{\|}}{C}-B$$

reactant can be employed when and where desired.

What is claimed is:

1. The method of making 1,1-dichloroolefins of the formula

wherein A and B are selected from the group consisting of hydrogen, hydrocarbyl radicals of from 1 to 17 carbon atoms and free of acetylenic unsaturation and said hydrocarbyl radicals having substituents selected from the group consisting of halogen, lower alkoxy, nitro, amino, mono-(lower alkyl)amino and di-(lower alkyl)amino which comprises reacting in an inert organic liquid medium a compound of the formula $$A-\underset{\underset{O}{\|}}{C}-B$$

wherein A and B have the aforedescribed significance with a phosphinedichloromethylene of the formula

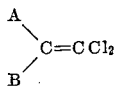

wherein R, R' and R" respectively contain from 1 to 12 carbon atoms and are selected from the group consisting of alkyl and alkoxyalkyl.

2. The method of making 1,1-dichloroolefins of the formula

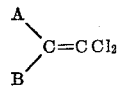

wherein A and B are selected from the group consisting of hydrogen, hydrocarbyl radicals of from 1 to 17 carbon atoms and free of acetylenic unsaturation and said hydrocarbyl radicals having substituents selected from the group consisting of halogen, lower alkoxy, nitro, amino, mono-(lower alkyl)amino and di-(lower alkyl)amino which comprises reacting in an inert organic liquid medium a compound of the formula $$A-\underset{\underset{O}{\|}}{C}-B$$

wherein A and B have the aforedescribed significance with a phosphinedichloromethylene of the formula

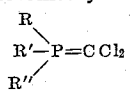

wherein R, R' and R" are alkyl radicals containing 1 to 8 carbon atoms.

3. The method of making 1,1-dichloroolefins of the formula

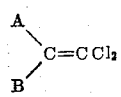

wherein A and B are hydrocarbyl radicals of from 1 to 11 carbon atoms and free of acetylenic unsaturation which comprises reacting in an inert liquid organic medium a ketone of the formula $$A-\underset{\underset{O}{\|}}{C}-B$$

wherein A and B have the aforedescribed significance with a phosphinedichloromethylene of the formula

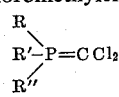

wherein R, R' and R" are alkyl radicals containing 1 to 8 carbon atoms.

4. The method of claim 3 wherein the phosphinedichloromethylene is tri(n-butyl)phosphinedichloromethylene.

5. The method of claim 3 wherein the phosphinedichloromethylene is tri(2-ethylhexyl)phosphinedichloromethylene.

6. The method of claim 3 wherein the phosphinedichloromethylene is triethylphosphinedichloromethylene.

7. The method of claim 3 wherein A and B are aromatic hydrocarbyl radicals of from 6 to 10 carbon atoms.

8. The method of claim 3 wherein A and B respectively are phenyl.

9. The method of making 1,1-dichloro-2,2-diphenylethylene which comprises reacting in an inert organic liquid medium benzophenone and tri(n-butyl)phosphinedichloromethylene.

References Cited by the Examiner

UNITED STATES PATENTS

| | | | |
|---|---|---|---|
| 2,879,303 | 3/1959 | Isler et al. | 260—606.5 |
| 2,879,304 | 3/1959 | Isler et al. | 260—606.5 |
| 2,930,814 | 3/1960 | Ramirez | 260—606.5 |
| 2,945,888 | 7/1960 | Surmatis | 260—606.5 |
| 2,998,416 | 8/1961 | Mendel | 260—606.5 |
| 3,095,455 | 6/1963 | Marco et al. | |
| 3,139,377 | 6/1964 | Ratts | 260—651 X |

LEON ZITVER, *Primary Examiner.*